(12) United States Patent
Stimmel et al.

(10) Patent No.: US 6,421,358 B1
(45) Date of Patent: Jul. 16, 2002

(54) METHOD AND SYSTEM FOR DELIVERING A SYNCHRONIZED STREAM OF BROADCAST EVENT DATA, LIVE EVENT DATA, AND STATIC EVENT DATA OVER A HYBRID FIBER COAX NETWORK

(75) Inventors: Carol L. Stimmel, Boulder; Ken Anderson, Lafayette, both of CO (US)

(73) Assignees: MediaOne Group, Inc., Englewood; US West, Inc., Denver, both of CO (US)

(*) Notice: Subject to any disclaimer, the term of this patent is extended or adjusted under 35 U.S.C. 154(b) by 6 days.

(21) Appl. No.: 09/662,963

(22) Filed: Sep. 15, 2000

(51) Int. Cl.[7] .................. H04L 12/28; H04L 12/56; H04J 3/06; H04N 7/173
(52) U.S. Cl. ............... 370/489; 370/397; 370/503; 370/516; 725/119; 725/129
(58) Field of Search ................. 370/489, 486, 370/487, 516, 347, 375, 458, 394; 348/6, 7, 10, 12, 13, 14, 15, 16, 17; 714/752, 776

(56) References Cited

U.S. PATENT DOCUMENTS

| | | | | |
|---|---|---|---|---|
| 4,868,866 A | * | 9/1989 | Williams, Jr. ............ | 707/9 |
| 5,613,032 A | * | 3/1997 | Cruz et al. ............... | 370/487 |
| 5,666,358 A | * | 9/1997 | Paratore et al. .......... | 370/347 |
| 5,745,837 A | * | 4/1998 | Fuhrmann ................ | 455/5.1 |
| 5,790,171 A | * | 8/1998 | Klopfer et al. ........... | 348/6 |
| 5,847,751 A | * | 12/1998 | Safadi ...................... | 348/7 |
| 6,208,665 B1 | * | 3/2001 | Loukianov et al. ...... | 370/486 |
| 6,239,892 B1 | | 5/2001 | Davidson | |
| 6,253,375 B1 | * | 6/2001 | Gordon et al. ........... | 725/88 |
| 6,272,658 B1 | * | 8/2001 | Steele et al. ............. | 714/752 |

* cited by examiner

*Primary Examiner*—Wellington Chin
*Assistant Examiner*—M. Phan
(74) *Attorney, Agent, or Firm*—Brooks & Kushman, P.C.

(57) ABSTRACT

A system and associated method for delivering a data stream to an audience member a communications device associated with an audience member. A hybrid fiber coax (HFC) network is connected to the communications device for communicating data with the audience member. A synchronization processor receives broadcast event data of event objects of an event, live event data of event objects of the event, and static event data of event objects of the event. The synchronization processor generates a synchronized data stream having broadcast, live, and static event data for an event object of the event. The synchronization processor transmits the synchronized data stream to the communications device for access by the audience member via the HFC network. The synchronization processor processes the broadcast event data to determine an event object being broadcasted. The synchronization processor selects the live event data and the statice event data corresponding to the determined event object. The synchronization processor generates the synchronized data stream by combining the broadcast event data of the determined event object with the selected live event and statice event data.

17 Claims, 3 Drawing Sheets

METHOD AND SYSTEM FOR DELIVERING A SYNCHRONIZED STREAM OF BROADCAST EVENT DATA, LIVE EVENT DATA, AND STATIC EVENT DATA OVER A HYBRID FIBER COAX NETWORK

TECHNICAL FIELD

The present invention relates generally to methods and systems for delivering data over a hybrid fiber coax (HFC) network and, more particularly, to a method and system for delivering a synchronized stream of broadcast event data, live event data, and static event data over a HFC network.

BACKGROUND ART

A hybrid fiber coax (HFC) network provides substantial bandwidth. Members of an audience connect to the HFC network to receive broadcast data. Typically, when an event is being broadcasted through the HFC network to an audience only a portion of the bandwidth is being used to transmit broadcast data to the audience. For instance, during the broadcast of a golf tournament only a portion of the HFC bandwidth is being used to transmit broadcast data such as video data of the golfers and the golf course along with audio data of the golf announcers to members of the audience. It is desired that the bandwidth of the HFC network be fully utilized to enhance the broadcast experience.

DISCLOSURE OF INVENTION

Accordingly, it is an object of the present invention to provide a method and system for delivering a synchronized stream of broadcast event data, live event data, and static event data over a hybrid fiber coax (HFC) network.

It is another object of the present invention to provide a method and system for synchronizing broadcast event data, live event data, and static event data together into a synchronized stream for delivery over a HFC network.

In carrying out the objects and other objects, the present invention provides a system for delivering a data stream to an audience member. The system includes a communications device associated with an audience member. A hybrid fiber coax network is connected to the communications device for communicating data with the audience member. A synchronization processor receives broadcast event data of event objects of an event, live event data of event objects of the event, and static event data of event objects of the event. The synchronization processor generates a synchronized event data stream having broadcast event data, live event data, and static event data for an event object of the event. The synchronization processor transmits the synchronized event data stream to the communications device for access by the audience member via the hybrid fiber coax network.

The synchronization processor processes the broadcast event data to determine an event object being broadcasted. The synchronization processor selects the live event data corresponding to the determined event object and selects the static event data corresponding to the determined event object. The synchronization processor generates the synchronized event data stream by combining the broadcast event data of the determined event object with the selected live event data and the selected static event data.

The communications device and the hybrid fiber coax network are operable with one another to enable the audience member to select the live event data and the static event data for the synchronized event data stream transmitted to the audience member.

Further, in carrying out the objects and other objects, the present invention provides a method for delivering a data stream to an audience member. The method includes associating a communications device with an audience member. A hybrid fiber coax network is then connected to the communications device for communicating data with the audience member. Broadcast event data of event objects of an event, live event data of event objects of the event, and static event data of event objects of the event is then received. A synchronized event data stream having broadcast event data, live event data, and static event data for an event object of the event is then generated. The synchronized event data stream is then transmitted to the communications device for access by the audience member via the hybrid fiber coax network.

The method may further include processing the broadcast event data to determine an event object being broadcasted. The live event data and the static event corresponding to the determined event object is then selected. Generating the synchronized event data stream includes combining the broadcast event data of the determined event object with the selected live event data and the selected static event data.

The method may further include selecting the live event data and the static event data for the synchronized event data stream transmitted to the audience member by using the communications device and the hybrid fiber coax network.

The advantages of the method and system of the present invention are numerous. The present invention solves the problem of providing an interactive experience with a broadcast experience that is by nature complimentary rather than competitive. The synchronized event data stream allows the members of the audience to access data appropriate to the event without overlaying any interactive data on top of the broadcast itself. The present invention provides commercial value for hardware developers of any complementary IP devices; provides commercial value for the broadcaster by providing synchronized advertising; provides commercial value for content providers; and provides commercial value for HFC network operators that provide the enhanced services.

These and other objects, features, and advantages of the present invention will be readily apparent upon consideration of the following detailed description in conjunction with the accompanying drawings.

BEST MODE FOR CARRYING OUT THE INVENTION

Figure 1:
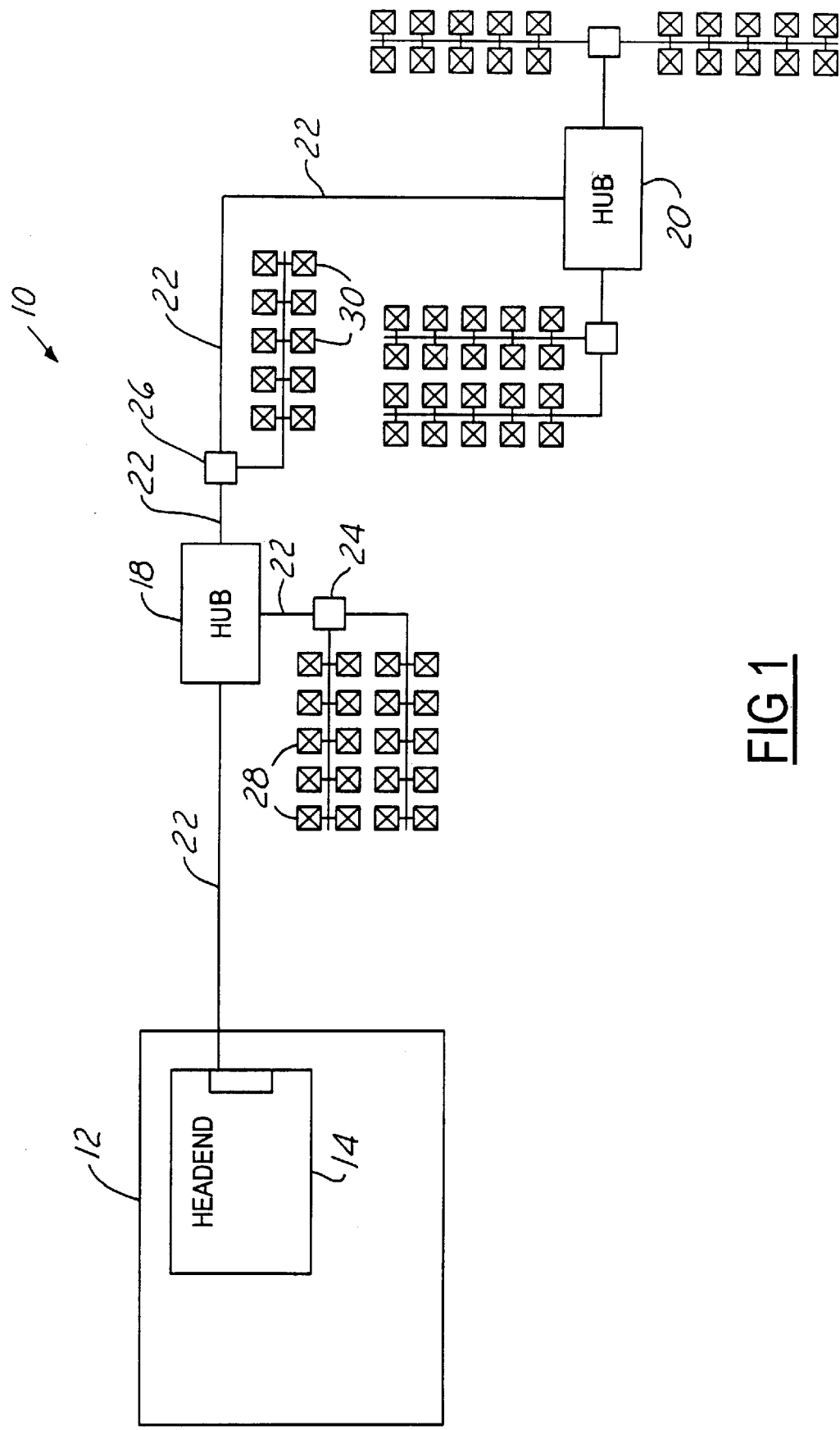
FIG. 1 illustrates a hybrid fiber coax network for use with the method and system of the present invention.

Referring now to FIG. 1, a network 10 for use with the present invention is shown. Network 10 includes a central office 12 having a head end 14. Depending on the size of the service area, it may be desirable to provide additional head ends. Head end 14 communicates with a plurality of hubs 18, 20 over fiber 22. Hubs 18, 20 communicate with a plurality of nodes. Nodes are generally located in each neighborhood that is serviced. As shown, hub 18 communicates with nodes 24, 26. Optoelectronic conversion takes place at node 24 and the communication signals are then distributed over coax to serve a number of users 28. Node 26 distributes communication signals over coax to users 30.

Network 10 is a hybrid fiber coax (HFC) network. An HFC network is a communications network in which fiber is distributed from a central office to hubs, the fiber continuing to nodes in a neighborhood, and then the last leg of the communication path is performed over coax to each of the users in the neighborhood. By using coax for the last leg of the communication path, the existing coax drops in many neighborhoods may be used and the expense of laying new wire line in the neighborhood may be saved.

Figure 2:
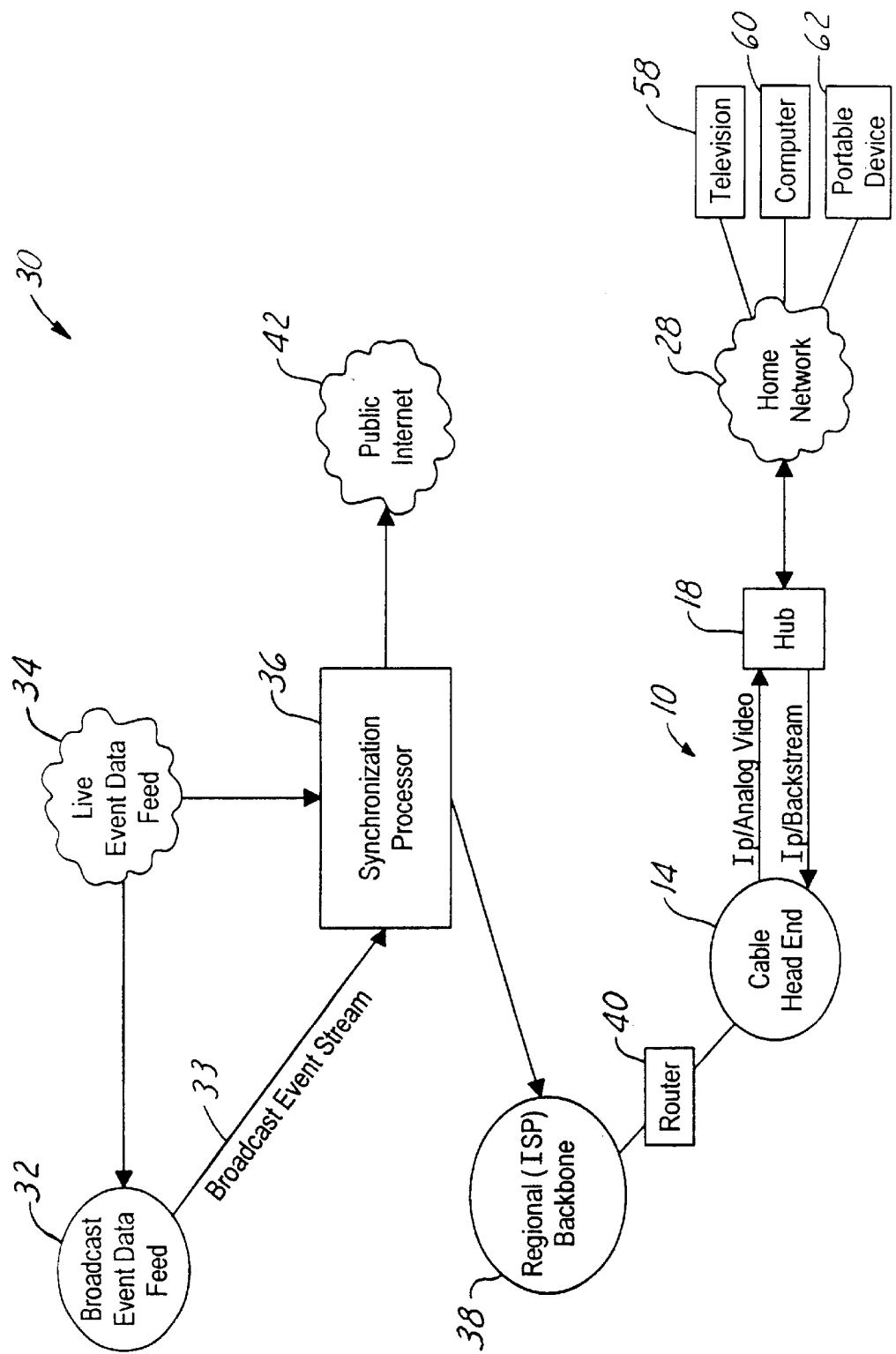
FIG. 2 illustrates a communications network in accordance with the method and system of the present invention.

Referring now to FIG. 2, a communications network 30 in accordance with the method and system of the present invention is shown. Communications network 30 includes HFC network 10. In communications network 30, cable head end 14 of HFC network 10 is connected to a regional Internet Service Provider (ISP) backbone or a regional data center 38 by a router 40. Communications network 30 further includes a broadcast event data feed 32 and a live event data feed 34. Broadcast event data feed 32 and live event data feed 34 are connected to a synchronization processor 36. Synchronization processor 36 is connected to regional backbone 38 and the public Internet 42.

Broadcast event data feed 32 provides broadcast data 33 of event objects of an event to synchronization processor 36. The broadcast event data includes video and audio data of event objects of an event. For example, the event is golf and the event objects are the golfers, the holes of the golf course, the clubs used by the golfers, and the like. The broadcast video data includes video of the golfers during play, the golf course layout, the travel of the golf ball during play, and the like. The audio data includes verbal communication from golf announcers describing the play during the golf tournament, the sound of the golf clubs hitting the golf balls, the crowd reaction, and the like.

Live event data feed 34 provides Internet Protocol (IP) live data regarding the event objects of the event to synchronization processor 36. For instance, the event object is a golfer and the live data includes biometric information such as the heart rate of the golfer while golfing, information regarding the golf club being used by the golfer, the force generated by the golfer when swinging at the golf ball, and the like. The event object may be the golf ball and the live data would include the distance from the golf ball lying on the golf course to the hole, velocity of the golf ball during flight, the trajectory of the golf ball during flight, and the like.

Figure 3:
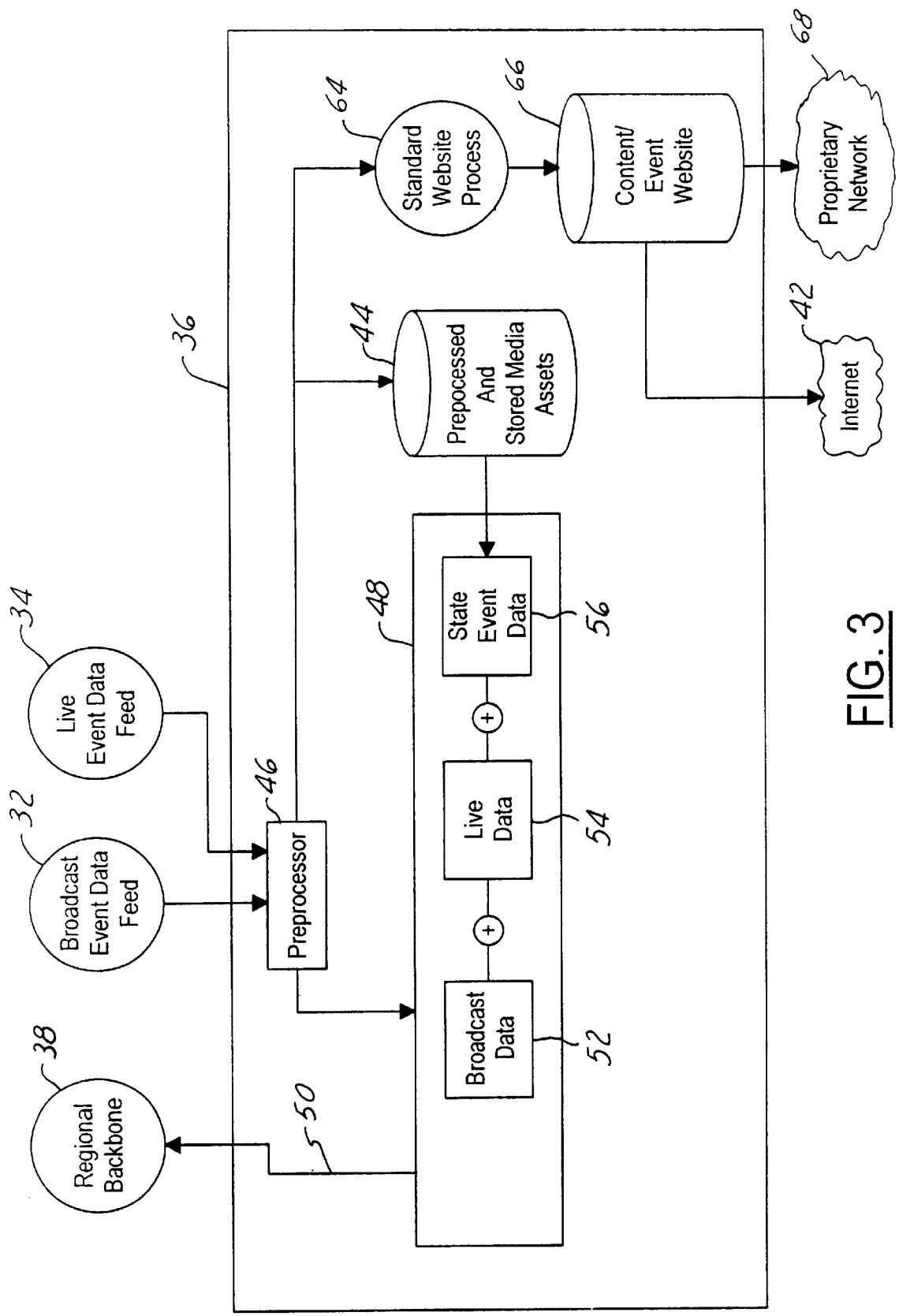
FIG. 3 illustrates in greater detail the synchronization processor of the communications network shown in FIG. 2.

Referring now to FIG. 3, with continual reference to FIG. 2, synchronization processor 36 synchronizes the broadcast event data and the live event data together with static event data to form a synchronized event stream. The static event data is pre-collected data regarding slow changing aspects of the event objects of the event. For instance, the event object is a putting green of the golf course and the static data is a digitized representation of a 360 degree view of the putting green.

The event object may be the layout of the golf course and the static data would be a digitized representation of a 360 degree view of the course layout. The event object may be the golf tournament and the static data would be information regarding the history of the golf tournament. The event object may be the weather during the golf tournament and the static data would be weather information. The event object may be a golfer and the static data would be comments made by the caddy of the golfer regarding the golfer, the statistics of the golfer, and the like.

Synchronization processor 36 synchronizes the broadcast event data and the live event data together with static event data to form a synchronized event stream for event objects. For example, the event objects are a golfer and a putting green. The broadcast event data includes video of the golfer getting ready to take a shot on a putting green of the golf course, the live event data includes information regarding the heart rate of the golfer and the lie of the golf ball on the putting green, the static event data includes a digitized representation of the putting green.

Synchronization processor 36 includes a pre-processed and stored media assets database 44 for storing static event data for each event object. The static event data is collected prior to the event and then stored in database 44 for use during broadcasting of the event. For example, for an event such as a golf tournament, golf course data including digital representations of the course layout and holes would be ingested into database 44. Continuing with the analogy, other data types ingested include 360 degree views of the sporting venue, such as a view from the golf tees using technologies such as IPIX and Quicktime VR; images of the putting greens that can be manipulated by viewers using technologies such as Java3D, Virtus Open Space, and VRML; streaming media sources such as a fly over of each golf hole using technologies such as Windows Media, Quicktime 4, and Real Video; two dimensional images in traditional formats; and text based data products that can describe things like golf course architect notes, golf caddie books, history of the golf holes, and other facts about the golf course, the golf equipment, and the golfers.

Synchronization processor 36 includes a pre-processor 46 for mapping together the broadcast event data from broadcast event data feed 32 with the live event data from live event data feed 34. Pre-processor 46 applies rules about appropriate data format for web, tablet, etc., and makes the data format appropriate for different broadcasting systems. Pre-processor 46 analyzes the broadcast event data to determine which event objects are currently being broadcasted. Pre-processor 46 then associates the broadcasted event objects with the live event data corresponding to the broadcasted event objects. For instance, if the broadcasted event object is a golfer pre-processor 46 associates live event data such as the golfer's heart rate while lining up a golf putt on the putting green.

Synchronization processor 36 further includes a stream processor 48 for receiving the mapped broadcast event data and live event data from pre-processor 46. Stream processor 48 synchronizes the mapped broadcast and live event data from pre-processor 46 together with static event data from database 44 to form a synchronized event stream 50 for event objects. Stream processor 48 determines the current event object, i.e., putting green that the golfer is currently playing, and then associates the applicable static event data with the mapped broadcast and live event data. Stream processor 48 accesses database 44 to obtain the applicable static event data. For instance, the applicable static event data is a three dimensional view of the putting green that the golfer is currently playing. Stream processor 48 then overlays the broadcast event data 52 with the live event data 54 and the static event data 56 to form a synchronized event stream 50. Synchronization processor 36 then provides the synchronized event stream to regional backbone 38 for delivery over HFC network 10 to an audience.

As shown in FIG. 2, regional backbone 38 transmits the synchronized event stream to cable head end 14 via router 40. The synchronized event stream is an IP/analog video signal transmitted from cable head end 14 to hub 18. Hub 18 then individually transmits the synchronized event stream to a home network 28 of a member of the audience. Home network 28 may transmit the synchronized event stream to a compatible appliance of the audience member. Such appliances include a television 58, a computer 60, and other portable IP based computing appliances 62.

The audience member can then watch the golf tournament with the enhanced data by using one of the appliances. For example, the audience member watches a video picture of the golfer lining up a golf putt on a putting green while getting live information regarding the golfer's heart rate during play and audio description by a commentator and then see how the golf ball moves along a three dimensional view of the putting green after being shot by the golfer.

Communications network 30 is configured so that the audience member can transmit a control signal to cable head end 14 for requesting certain live event data and static event data during the broadcast. The control signal is a IP back stream data signal transmitted from an appliance of the audience member to cable head end 14. The audience member transmits the IP back stream data signal to notify cable head end 14 about which data the audience member would like to be used for enhancing the broadcast. For example, the audience member may not care about the heart rate of the golfer during play but would like to see the force of the golf swings imparted by the golfer. In response to the appropriate IP back stream data signal cable head end 14 transmits the selected live and static event data with the broadcast data of the synchronized data stream to the audience member. Similarly, cable head end 14 removes live and static event data that the audience member does not wish to receive from the synchronized data stream being transmitted to the audience member.

Synchronization processor 36 may also transmit live event data and static event data in a data stream to the public Internet 42 for access by Internet users. This data stream transmitted to the Internet 42 is not timed with the broadcast data and does not include any broadcast data. Synchronization processor 36 includes a standard website process 64 which is connected to pre-processor 46 and static event database 44. Website process 64 receives live event data from pre-processor 44 and static event data from static event database 44. Website process 64 combines the live event data of an event object with the static event data of the event object into a data stream. Website process 64 then transmits this data stream to a content/event website 66 for transmission to Internet 42 or a proprietary network 68. Users accessing Internet 42 can then receive the data stream corresponding to live event data and static event data of an event object.

Thus it is apparent that there has been provided, in accordance with the present invention, a method and system for delivering a synchronized stream of broadcast event data, live event data, and static event data over a HFC network that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A system for delivering a data stream to an audience member, the system comprising:
a communications device associated with an audience member;
a hybrid fiber coax network connected to the communications device for communicating data with the audience member; and
a synchronization processor for receiving broadcast event data of event objects of an event, live event data of event objects of the event, and static event data of event objects of the event, wherein the synchronization processor processes the broadcast event data to determine an event object being broadcasted, wherein the synchronization processor selects the live event data corresponding to the determined event object and selects the static event data corresponding to the determined event object, wherein the synchronization processor generates a synchronized event data stream having broadcast event data, live event data, and static event data for the determined event object by combining the broadcast event data of the determined event object with the selected live event data and the selected static event data, wherein the synchronization processor transmits the synchronized event data stream to the communications device for access by the audience member via the hybrid fiber coax network.

2. The system of claim 1 wherein:
the static event data is data that is collected prior to the event, wherein the synchronization processor includes a static event database for storing the static event data.

3. The system of claim 1 further comprising:
a broadcast event data feed for supplying the broadcast event data to the synchronization processor.

4. The system of claim 1 further comprising:
a live event data feed for supplying the live event data to the synchronization processor.

5. The system of claim 1 wherein:
the communications device and the hybrid fiber coax network are operable with one another to enable the audience member to select the live event data for the synchronized event data stream transmitted to the audience member.

6. The system of claim 1 wherein:
the communications device and the hybrid fiber coax network are operable with one another to enable the audience member to select the static event data for the synchronized event data stream transmitted to the audience member.

7. The system of claim 1 wherein:
the communications device and the hybrid fiber coax network are operable with one another to enable the audience member to select the live event data and the static event data for the synchronized event data stream transmitted to the audience member.

8. The system of claim 1 further comprising:
an Internet, wherein the synchronization processor generates a data stream having live event data for an event object of the event and then transmits the data stream to the Internet for access by Internet users.

9. The system of claim 1 wherein:
the broadcast event data includes video data of event objects of the event.

10. The system of claim 1 wherein:
the broadcast event data includes audio data of event objects of the event.

11. The system of claim 1 wherein:
the live event data includes real time data of event objects of the event.

12. A system for generating a data stream for transmission to an audience member, the system comprising:

a synchronization processor for receiving broadcast event data of event objects of an event, live event data of event objects of the event, and static event data of event objects of the event, wherein the synchronization processor processes the broadcast event data to determine an event object being broadcasted, wherein the synchronization processor selects the live event data corresponding to the determined event object and selects the static event data corresponding to the determined event object, wherein the synchronization processor generates a synchronized event data stream having broadcast event data, live event data, and static event data for determined event object by combining the broadcast event data of the determined event object with the selected live event data and the selected static event data.

13. The system of claim 12 wherein:

the static event data is data that is collected prior to the event, wherein the synchronization processor includes a static event database for storing the static event data.

14. A method for delivering a data stream to an audience member, the method comprising:

associating a communications device with an audience member;

connecting a hybrid fiber coax network to the communications device for communicating data with the audience member; and receiving broadcast event data of event objects of an event, live event data of event objects of the event, and static event data of event objects of the event;

processing the broadcast event data to determine an event object of the event being broadcasted;

selecting the live event data corresponding to the determined event object;

selecting the static event data corresponding to the determined event object;

generating a synchronized event data stream having broadcast event data, live event data, and static event data for the determined event object by combining the broadcast event data of the determined event object with the selected live event data and the selected static event data; and transmitting the synchronized event data stream to the communications device for access by the audience member via the hybrid fiber coax network.

15. The method of claim 14 wherein:

the static event data is data that is collected prior to the event.

16. The method of claim 14 further comprising:

selecting the live event data for the synchronized event data stream transmitted to the audience member by using the communications device and the hybrid fiber coax network.

17. The method of claim 14 further comprising:

selecting the static event data for the synchronized event data stream transmitted to the audience member by using the communications device and the hybrid fiber coax network.

\* \* \* \* \*